United States Patent [19]
Estes

[11] Patent Number: 5,803,121
[45] Date of Patent: Sep. 8, 1998

[54] AIR BAG VENTING SYSTEM

[75] Inventor: Judson B. Estes, Milford, Mich.

[73] Assignee: Chrysler Corporation, Auburn Hills, Mich.

[21] Appl. No.: 839,832

[22] Filed: Apr. 17, 1997

[51] Int. Cl.$^6$ .................................................. F16K 15/14
[52] U.S. Cl. ........................... 137/849; 280/740; 383/45
[58] Field of Search .............................. 137/849; 383/44, 383/45, 51; 280/728.1, 737, 740

[56] References Cited

U.S. PATENT DOCUMENTS

| | | | |
|---|---|---|---|
| 2,897,835 | 8/1959 | Philippe | 137/849 |
| 3,401,867 | 9/1968 | Long et al. | 137/849 |
| 3,724,179 | 4/1973 | Leinfelt | 137/849 |
| 3,895,646 | 7/1975 | Howat | 137/849 |
| 5,573,270 | 11/1996 | Sogi et al. | 280/740 |
| 5,593,179 | 1/1997 | Maruyama | 280/740 |

FOREIGN PATENT DOCUMENTS 559321  3/1957  Italy ........................................ 137/849

*Primary Examiner*—Denise L. Ferensic
*Assistant Examiner*—Joanne Y. Kim
*Attorney, Agent, or Firm*—Lawrence J. Shurupoff

[57] ABSTRACT

A valve for controlling a port in an air bag comprises a circular valve disk secured over the port. The disk has a circular mounting ring. Flexible valve elements extend radially inwardly from the ring. Each valve element is in the form of a wedge-shaped leaf with opposite side edges tapering radially inwardly to a point at the center of the ring. The valve is closed when the side edges of adjacent leaves are in contact. When the air bag deploys, the pressure of air in the bag flexes the leaves outwardly to open the valve.

9 Claims, 3 Drawing Sheets

5,803,121

AIR BAG VENTING SYSTEM

FIELD OF INVENTION

This invention relates generally to a venting system for vehicle air bags, and more particularly to a valve for controlling the venting of an air bag.

BACKGROUND AND SUMMARY OF THE INVENTION

Air bags typically have at least a portion of the air bag envelop formed of porous material. The purpose is to vent the pressure of air after the air bag has deployed. Otherwise a person slamming against the air bag would not be adequately cushioned.

In accordance with the present invention, instead making a portion of the air bag porous, venting is accomplished by a valve in the form of a disk which may be relatively small, on the order of 1" or 2" in diameter, for example. The valve may be designed to open a variable amount depending on pressure. The valve has a plurality of valve elements which are normally closed but which open by the pressure of air in the air bag. Preferably, the valve is circular, and cut into triangular wedge-shaped leaves the same way one would cut a pie. The leaves may lie in a common plane before the air bag deploys, with their edges close together so that the valve is substantially closed. However, the pressure of air after deployment causes the leaves to spread out, beginning at the center, to vent the air bag. Preferably, the leaves have a minimum thickness at the center, and gradually increase in thickness to a maximum at the outer radius. Accordingly, the leaves open in a controlled manner, more readily initially and then requiring increased pressure to open further.

This invention also contemplates that the valve may be slightly open prior to deployment, then closing when the air bag initially deploys, after which it re-opens. Thus, the pie-shaped leaves may be molded so that initially they flare inwardly and are therefore open slightly. As the air pressure increases upon deployment, the leaves flex to a flat condition substantially closing the valve and then re-open as they flex outward. The reason for this construction is that in a frontal collision the initial impact, while substantial, is followed after a brief time interval by contact of the automobile engine with the obstruction, creating a sudden, violent deceleration and requiring more rapid venting.

One advantage of the small vent of this invention is that there will be less total loss of air than when venting is accomplished by a porous section of the air bag, thereby permitting a smaller inflater.

One object of this invention is to provide a venting system for a vehicle air bag having the foregoing features and capabilities.

Another object is to provide a venting system for venting an air bag having a valve which is of simple construction, is highly effective in use, and is inexpensive to manufacture and easily installed.

Other objects, features, and advantages will become more apparent as the following description proceeds, especially when considered with the accompanying drawings.

DETAILED DESCRIPTION OF PREFERRED EMBODIMENTS

Figure 1:
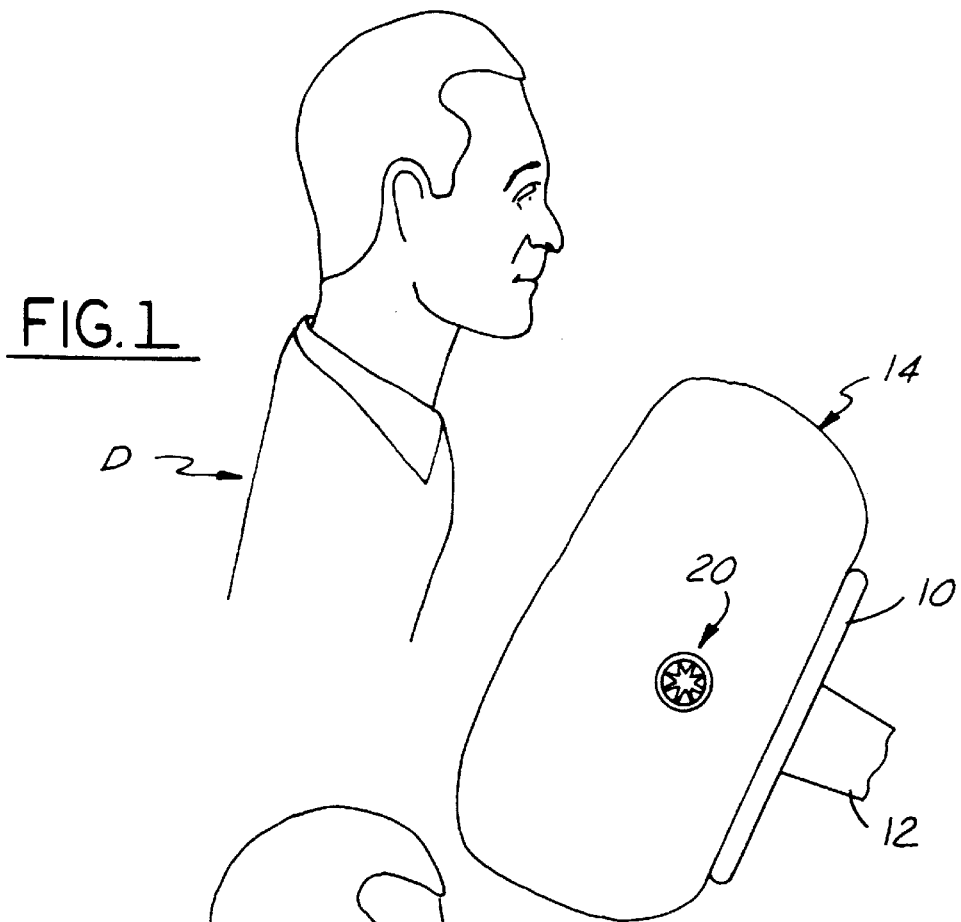
FIG. 1 is a side view showing the upper body of a person just prior to impact with an inflated air bag, having the venting system of this invention. The venting valve has not yet opened.
Figure 2:
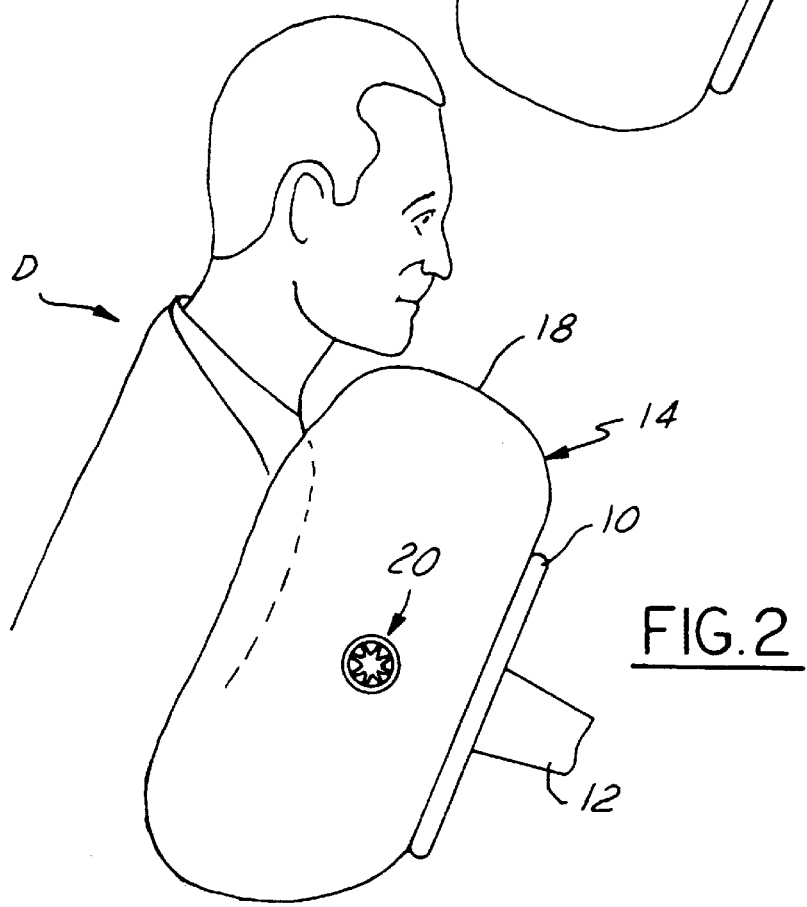
FIG. 2 is a view similar to FIG. 1, but after impact in which the chest of the person contacts the inflated air bag. The venting valve is shown open.

Referring now more particularly to the drawings, and especially FIGS. 1–8, there is shown a steering wheel 10 on the end of a steering column 12 of an automotive vehicle, and an air bag 14 carried by the steering wheel. The air bag is formed of any suitable non-porous, flexible material. The air bag is designed to deploy and inflate as in FIGS. 1 and 2 when the vehicle is involved in a severe frontal impact. The upper body of the driver D is shown in FIG. 1 spaced from the inflated air bag 14 immediately after deployment, and in FIG. 2 an instant later when the driver's chest is thrust forwardly into contact with the inflated air bag.

As a venting system for the air bag, there is secured over a port 16 in a wall 18 of the air bag a valve 20 constructed in accordance with this invention. Referring to FIGS. 3–8 the valve 20 is in the form of a flat disk having a circular mounting ring 22 secured and sealed to the air bag, as by a suitable adhesive or by sewing 23, over the port 16. The portion of the valve encircled by the ring 22 comprises a plurality of identical, flexible valve elements in the form of wedges or leaves 30. The leaves 30 are disposed side-by-side in a circular array, and are generally triangular or wedge-shaped with their radially outer extremities arcuately formed and integrally connected to the radially inner margin of the ring. The side edges 32 and 34 of the leaves taper radially inwardly and intersect or connect with one another in a point at the geometric center 36 of the ring.

Figure 7:
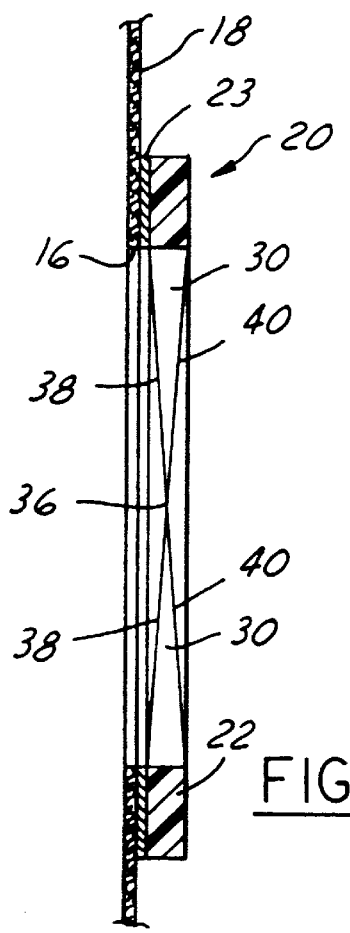
FIG. 7 is a sectional view taken on the line 7—7 in FIG. 5.

As shown in FIG. 7, the thickness of each leaf varies from a maximum at its outer extremity where its thickness is the same as the thickness of the ring, to substantially zero at its inner extremity. The inner and outer sides or surfaces 38 and 40 of each wedge are flat but taper toward one another.

Figure 3:
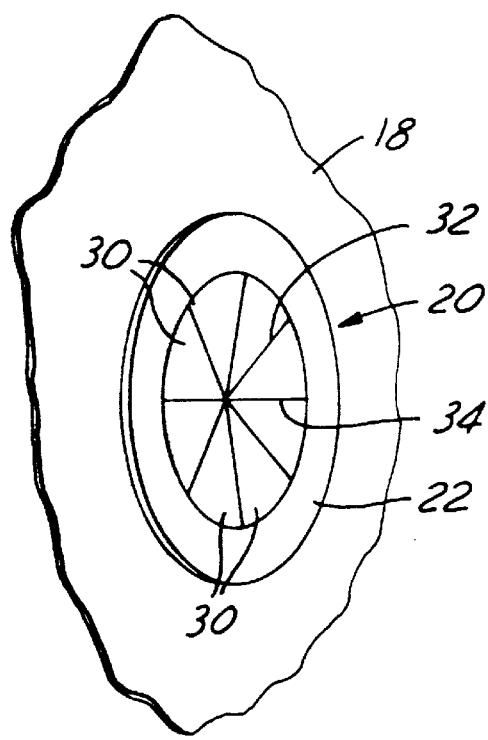
FIG. 3 is an enlarged, fragmentary perspective view of a portion of the air bag having a valve constructed in accordance with the invention, showing the valve closed.
Figure 5:
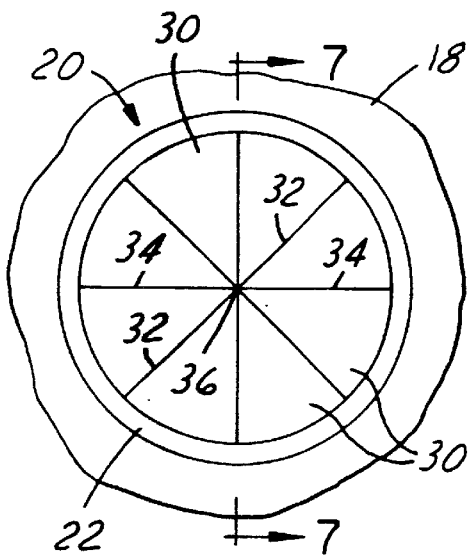
FIG. 5 is an elevational view of the closed valve.

The valve is shown in FIGS. 3, 5 and 7 in its unflexed, natural, free state condition before deployment of the air bag. The leaves 30 lie in the plane of the ring with their radially inner ends meeting at the center 36 of the ring. The side edges 32 and 34 of each leaf are in fuill and continuous contact throughout their length with the side edges of adjacent leaves to close the valve to the passage of air.

The valve is preferably of integral, one-piece construction and made of a suitable flexible material, such for example, as rubber or plastic. Polypropylene is a recommended plastic. The valve may be on the order of one to two inches in diameter with a ring thickness of about 2 millimeters. The wedges 30 preferably taper from their radially outer extremities where their thickness is the same as the ring, to their radially inner extremities where they are about one-half mllimeter thick. These dimensions can vary within the scope of the invention.

Figure 4:
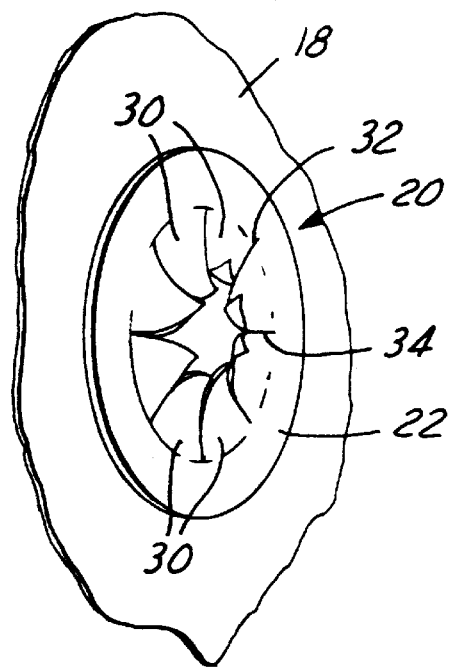
FIG. 4 is a perspective view similar to FIG. 3, but showing the valve open.
Figure 6:
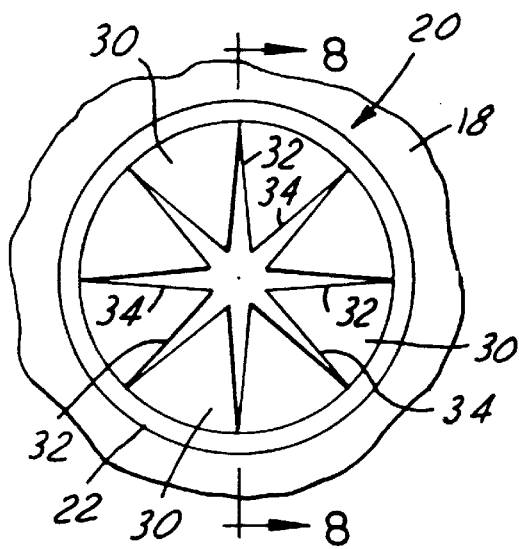
FIG. 6 is an elevational view of the open valve.
Figure 8:
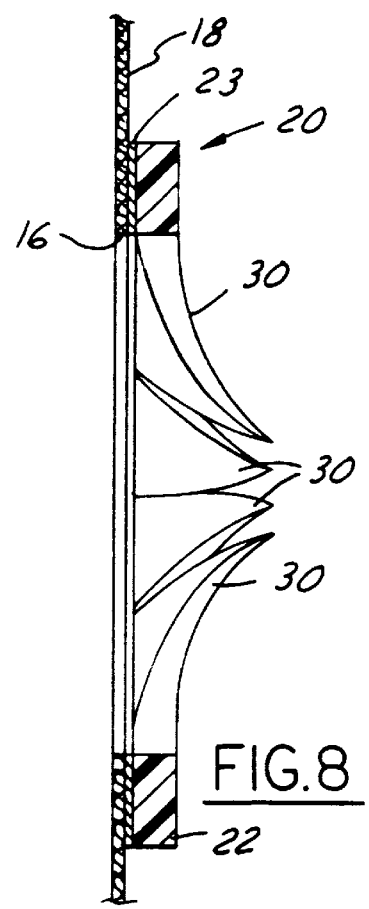
FIG. 8 is a sectional view taken on the line 8—8 in FIG. 6.

In the event of a strong and sudden frontal impact, an inflater, not shown, will admit air into the air bag, causing the air bag to deploy and fill with air under pressure. As the interior air bag pressure increases the leaves 30 will flex outwardly, as shown in FIGS. 4, 6 and 8, opening the valve and releasing air from the air bag. The occupant's chest will move forward and strike the air bag as in FIG. 2, increasing the pressure and causing further opening of the valve. Increased venting softens the air bag and results in lower deceleration of the occupant.

Figure 9:
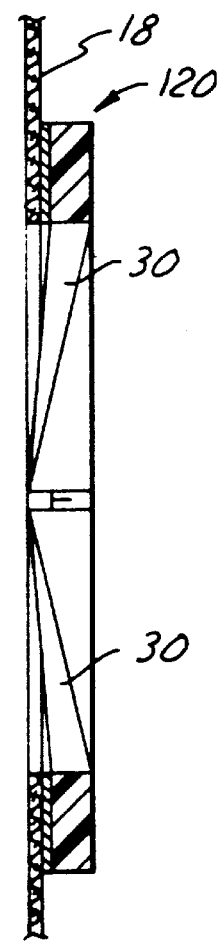
FIG. 9 is a sectional view showing a modification.

FIG. 9 shows a modification of the invention in which valve 120 appears in its natural, free state condition before deployment of the air bag. Actually the valve 120 is of exactly the same construction as the valve 20 previously described, except that in its natural or unflexed condition, its leaves flare inwardly, that is toward the inside of the air bag, and hence are slightly open. When the air pressure in the bag increases upon deployment, the leaves flex outwardly to a flat condition in the plane of the ring, substantially closing the vent. Increasing pressure causes the leaves to re-open by flexing or flaring outwardly. Accordingly, there is venting as soon as air enters the bag. This provides initial cushioning when the occupant first hits the bag, and then an instant later when the engine hits the obstruction, the sudden violent deceleration causes more rapid venting as the leaves flare outwardly forming a wider outlet for the air.

While the valve of this invention has been shown for an air bag mounted in the steering wheel of a vehicle, it may also be used with a passenger side air bag.

What is claimed is:

1. A valve for controlling a port in an air bag of an automotive vehicle, said valve comprising a disk secured to the air bag over the port therein, said disk having a plurality of valve elements arranged side-by-side and each having opposite side edges, said valve elements in one position thereof having the side edges of adjacent valve elements in contact with one another to substantially prevent flow of air but being movable away from one another by pressure of air in the bag to positions permitting the flow of air out of the bag, said valve elements being disposed in a circular array, each valve element being in the form of a generally wedge-shaped leaf with the side edges thereof tapering radially inwardly to a point at the center of the array.

2. A valve as defined in claim 1, wherein each of said leaves has an inner surface and an outer surface, said inner and outer surfaces of each leaf tapering toward one another in a radially inward direction.

3. A valve for controlling a port in an air bag of an automotive vehicle, said valve comprising a disk secured to the air bag over the port therein, said disk having a plurality of valve elements arranged side-by-side and each having opposite side edges, said valve elements in one position thereof having the side edges of adjacent valve elements in contact with one another to substantially prevent flow of air but being movable away from one another by pressure of air in the bag to positions permitting the flow of air out of the bag, said disk comprising a circular ring secured to the air bag, said valve elements being disposed in a circular array and extending radially inwardly from said ring, each valve element being in the form of a generally wedge-shaped leaf with the side edges thereof tapering radially inwardly to a point at the center of the array.

4. A valve as defined in claim 3, wherein said valve elements are in the form of a flexible, identical leaves.

5. A valve as defined in claim 4, wherein said disk is of integral, one-piece construction.

6. A valve as defined in claim 5, wherein each of said leaves has an inner surface and an outer surface, said inner and outer surfaces of each leaf tapering toward one another in a radially inward direction.

7. A valve as defined in claim 6, wherein said leaves in their unflexed condition lie in the plane of the ring with the side edges of adjacent leaves contacting one another to close the valve.

8. A valve as defined in claim 6, wherein said leaves in their unflexed condition flare inwardly toward the inside of the air bag to partially open the valve.

9. A valve as defined in claim 6, wherein said disk is made of polypropylene.

\* \* \* \* \*